United States Patent
Tamura et al.

(10) Patent No.: US 10,897,062 B2
(45) Date of Patent: Jan. 19, 2021

(54) LITHIUM ION SECONDARY BATTERY

(71) Applicant: NEC Corporation, Tokyo (JP)

(72) Inventors: Noriyuki Tamura, Tokyo (JP); Katsumi Maeda, Tokyo (JP); Qian Cheng, Tokyo (JP)

(73) Assignee: NEC Corporation, Tokyo (JP)

( * ) Notice: Subject to any disclaimer, the term of this patent is extended or adjusted under 35 U.S.C. 154(b) by 110 days.

(21) Appl. No.: 16/307,657

(22) PCT Filed: Jun. 13, 2017

(86) PCT No.: PCT/JP2017/021809
§ 371 (c)(1),
(2) Date: Dec. 6, 2018

(87) PCT Pub. No.: WO2017/217407
PCT Pub. Date: Dec. 21, 2017

(65) Prior Publication Data
US 2019/0312306 A1    Oct. 10, 2019

(30) Foreign Application Priority Data

Jun. 13, 2016 (JP) ................................. 2016-117204

(51) Int. Cl.
| | | |
|---|---|---|
| *H01M 10/0567* | (2010.01) | |
| *H01M 4/587* | (2010.01) | |
| *H01M 4/36* | (2006.01) | |
| *H01M 4/505* | (2010.01) | |
| *H01M 4/525* | (2010.01) | |
| *H01M 10/0525* | (2010.01) | |
| *H01M 10/0568* | (2010.01) | |
| *H01M 10/0569* | (2010.01) | |
| *H01M 4/02* | (2006.01) | |

(52) U.S. Cl.
CPC ......... *H01M 10/0567* (2013.01); *H01M 4/36* (2013.01); *H01M 4/366* (2013.01); *H01M 4/505* (2013.01); *H01M 4/525* (2013.01); *H01M 4/587* (2013.01); *H01M 10/0525* (2013.01); *H01M 10/0568* (2013.01); *H01M 10/0569* (2013.01); *H01M 2004/021* (2013.01); *H01M 2300/004* (2013.01)

(58) Field of Classification Search
CPC ......... H01M 10/0567; H01M 10/0525; H01M 4/587; H01M 4/36
See application file for complete search history.

(56) References Cited

U.S. PATENT DOCUMENTS

| | | | | |
|---|---|---|---|---|
| 2009/0136849 A1* | 5/2009 | Yue | ..................... | H01M 4/1393 429/231.8 |
| 2010/0092869 A1 | 4/2010 | Kaneko et al. | | |
| 2012/0315546 A1 | 12/2012 | Kaneko et al. | | |
| 2014/0045011 A1 | 2/2014 | Yamami et al. | | |
| 2015/0044567 A1* | 2/2015 | Tanjo | ..................... | H01M 4/505 429/223 |
| 2015/0072249 A1* | 3/2015 | Yamamoto | ............ | H01M 4/131 429/338 |
| 2015/0249269 A1* | 9/2015 | Yoon | .................. | H01M 10/0568 429/332 |
| 2016/0028115 A1 | 1/2016 | Kim et al. | | |
| 2016/0211553 A1 | 7/2016 | Ito et al. | | |

FOREIGN PATENT DOCUMENTS

| | | |
|---|---|---|
| EP | 2887441 A1 | 6/2015 |
| EP | 3051618 A1 | 8/2016 |
| JP | 2005-294011 A | 10/2005 |
| JP | 2009-187698 A | 8/2009 |
| JP | 2010-097696 A | 4/2010 |
| JP | 2014-035922 A | 2/2014 |
| JP | 5472041 B2 | 4/2014 |
| JP | 2015-215977 A | 12/2015 |
| JP | 2016-503571 A | 2/2016 |
| WO | WO-2015/046475 A1 | 4/2015 |
| WO | WO-2015/065903 A1 | 5/2015 |

OTHER PUBLICATIONS

International Search Report corresponding to PCT/JP2017/021809, 2 pages, dated Aug. 29, 2017.

\* cited by examiner

*Primary Examiner* — Kenneth J Douyette
(74) *Attorney, Agent, or Firm* — Wilmer Cutler Pickering Hale and Dorr LLP

(57) ABSTRACT

In order to provide a lithium ion secondary battery having both high energy density and an excellent charging-rate characteristic, in the lithium ion secondary battery comprising a positive electrode, a negative electrode and an electrolyte solution, the electrolyte solution comprises 0.5 mol/l or more of Li[(FSO$_2$)$_2$N], 0.5 mol/l or more of LiPF$_6$, and LiPO$_2$F$_2$; and the negative electrode comprises graphite deposited with amorphous carbon or graphite coated with amorphous carbon and having a specific surface area of 4 m$^2$/g or less, as a negative electrode active material.

13 Claims, No Drawings

LITHIUM ION SECONDARY BATTERY

CROSS-REFERENCE TO RELATED APPLICATIONS

This application is a national stage application of International Application No. PCT/JP2017/021809 entitled "LITHIUM ION SECONDARY BATTERY," filed on Jun. 13, 2017, which claims the benefit of the priority of Japanese Patent Application No. 2016-117204 filed on Jun. 13, 2016, the disclosures of each of which are hereby incorporated by reference in their entirety.

TECHNICAL FIELD

The present invention relates to a lithium secondary battery using graphite in a negative electrode.

BACKGROUND ART

In the lithium ion secondary battery using graphite in a negative electrode, an excellent charging-rate characteristic is required in addition to high energy density. As means for improving the charging-rate characteristic, it is generally known that graphite deposited or coated with amorphous carbon is used; and that the particle size of graphite is reduced; however, just these means are not enough.

Then, studies have been conducted on supporting salts and additives to be added to an electrolyte solution. Patent Literature 1 discloses a lithium secondary battery using graphite coated with amorphous carbon and an electrolyte solution containing one or more of lithium difluorophosphate, lithium bis(fluorosulfonyl)amide and lithium fluorosulfonate. Patent Literature 2 discloses a lithium secondary battery using graphite coated with amorphous carbon and an electrolyte solution containing a highly concentrated LiFSI salt and a $LiPF_6$ salt, and having an excellent in a charging-rate characteristic.

CITATION LIST

Patent Literatures

Patent Literature 1: JP 5472041B
Patent Literature 2: JP 2015-215977A

SUMMARY OF INVENTION

Technical Problem

Based on the teachings of the background art, if graphite coated with amorphous carbon is used as a negative electrode active material and further an electrolyte solution containing $LiPO_2F_2$ in addition to a LiFSI salt and a $LiPF_6$ salt is used in order to obtain both high energy density and an excellent charging-rate characteristic, deterioration in the charging-rate characteristic rather occurs as a problem.

An object of the present invention is to provide a lithium ion secondary battery having both high energy density and an excellent charging-rate characteristic.

Solution to Problem

According to an aspect of the present invention, there is provided a lithium ion secondary battery including a positive electrode, a negative electrode and an electrolyte solution, in which the electrolyte solution includes 0.5 mol/l or more of $Li[(FSO_2)_2N]$, 0.5 mol/l or more of $LiPF_6$, and $LiPO_2F_2$; and the negative electrode includes graphite deposited with amorphous carbon or graphite coated with amorphous carbon and having a specific surface area of 4 $m^2/g$ or less, as a negative electrode active material.

Advantageous Effects of Invention

According to one aspect of the present invention, a lithium ion secondary battery having both high energy density and an excellent charging-rate characteristic can be provided.

DESCRIPTION OF EMBODIMENTS

The lithium ion secondary battery according to the present invention is a lithium ion secondary battery having a positive electrode, a negative electrode and an electrolyte solution, in which the electrolyte solution contains 0.5 mol/l or more of $Li[(FSO_2)_2N]$ (hereinafter LiFSI), 0.5 mol/l or more of $LiPF_6$, and $LiPO_2F_2$; and the negative electrode includes graphite deposited with amorphous carbon or graphite coated with amorphous carbon and having a specific surface area of 4 $m^2/g$ or less, as a negative electrode active material.

Now, individual constitutions will be described below.

(Negative Electrode)

In the negative electrode, graphite deposited with amorphous carbon or graphite coated with amorphous carbon is used as a negative electrode active material. The graphite deposited with amorphous carbon can be obtained by mixing amorphous carbon fine particles and graphite particles in a dry process or a wet process, thereby allowing the amorphous carbon fine particles to attach to the surface of graphite particles. For coating graphite with amorphous carbon, a method in which the surface of graphite particles is coated with amorphous carbon by CVD or the like, a method in which graphite particles are charged in an aqueous solution containing an amorphous carbon precursor and hydrothermal synthesis is conducted, and the like are mentioned. Hereinafter, graphite deposited with amorphous carbon or graphite coated with amorphous carbon will be sometimes collectively referred to as "amorphous carbon coated graphite".

It is necessary for the amorphous carbon coated graphite used in the present invention to have a specific surface area of 4 $m^2/g$ or less. If the specific surface area exceeds 4 $m^2/g$, the charging-rate characteristic rather deteriorates in consideration of the composition of an electrolyte solution according to the present invention. The specific surface area is preferably 0.1 $m^2/g$ or more, more preferably 0.5 $m^2/g$ or more and particularly preferably 1 $m^2/g$ or more.

Further, the average particle size of the amorphous carbon coated graphite is preferably 1 or more and 30 μm or less, more preferably 20 μm or less and further preferably 16 μm or less. The average particle size herein refers to a particle size (median diameter: $D_{50}$) at an integrated value of 50% in the particle size distribution (on the basis of volume) obtained by a laser diffraction scattering method.

Note that, there is a correlation influencing the effect to some extent between the specific surface area and the average particle size. Graphite having a large average particle size preferably has a small specific surface area. This is because the apparent surface area increases as the average particle size increases.

A negative electrode of a lithium ion secondary battery can be produced, for example, by forming a negative electrode active material layer containing a negative electrode active material made of amorphous carbon coated graphite and a binder on a negative electrode current collector. The negative electrode active material layer can be formed by a slurry application method usually used. More specifically, the negative electrode is obtained by preparing a slurry containing a negative electrode active material, a binder and a solvent, applying the slurry onto a negative electrode current collector, drying and, if necessary, applying pressure. Examples of a method for applying the negative electrode slurry include a doctor blade method, a die-coater method and a dip-coating method. Alternatively, the negative electrode can be obtained by forming a negative electrode active material layer in advance and then forming a metal thin film by a vapor deposition method, a sputtering method or the like, as a current collector.

The binder for a negative electrode is not particularly limited, and examples thereof include polyvinylidene fluoride (PVdF), a vinylidene fluoride-hexafluoro propylene copolymer, a vinylidene fluoride-tetrafluoroethylene copolymer, a styrene-butadiene copolymer rubber (SBR), polytetrafluoroethylene, polypropylene, polyethylene, polyimide, polyamide imide, methyl (meth)acrylate, ethyl (meth)acrylate, butyl (meth)acrylate, (meth)acrylonitrile, isoprene rubber, butadiene rubber and fluorine rubber. As a slurry solvent, N-methyl-2-pyrrolidone (NMP) and water can be used. If water is used as the solvent, further a thickener such as carboxymethyl cellulose, methyl cellulose, hydroxymethyl cellulose, ethyl cellulose and polyvinyl alcohol can be used.

The content of the binder for the negative electrode, in view of binding strength and energy density having a tradeoff relationship, preferably falls within the range of 0.1 to 30 parts by mass, more preferably the range of 0.5 to 25 parts by mass and further preferably, the range of 1 to 20 parts by mass relative to 100 parts by mass of the negative electrode active material.

The negative electrode current collector is not particularly limited, and copper, nickel, stainless, molybdenum, tungsten, tantalum and an alloy containing two or more of these are preferable in consideration of electrochemical stability. Examples of the shape thereof include foil, flat plate and mesh.

(Positive Electrode)

The positive electrode can be produced by preparing a slurry containing a positive electrode active material, a binder, a solvent, and further if necessary, a conductive aid, applying the slurry onto a positive electrode current collector, drying, and if necessary, applying pressure to form a positive electrode active material layer on the positive electrode current collector.

The positive electrode active material is not particularly limited, and a lithium composite oxide, lithium iron phosphate and the like can be used. Examples of the lithium composite oxide include lithium manganate ($LiMn_2O_4$); lithium cobaltate ($LiCoO_2$); lithium nickelate ($LiNiO_2$); compounds obtained by substituting at least part of the moieties of manganese, cobalt and nickel of these lithium compounds with other metal elements such as aluminum, magnesium, titanium and zinc; nickel-substituted lithium manganate obtained by substituting part of the manganese moiety of lithium manganate with at least nickel; cobalt-substituted lithium nickelate obtained by substituting part of nickel moiety of lithium nickelate with at least cobalt; a compound obtained by substituting part of the manganese moiety of nickel-substituted lithium manganate with other metal (at least one of, for example, aluminum, magnesium, titanium and zinc); and a compound obtained by substituting part of the nickel moiety of cobalt-substituted lithium nickelate with other metal element (at least one of, for example, aluminum, magnesium, titanium and zinc). These lithium composite oxides can be used alone or as a mixture of two or more.

In particular, in the present invention, a lithium composite oxide having a layered structure can be preferably used. Examples of the lithium composite oxide having a layered structure include $LiCo0.8Ni_{0.2}O_2$, $LiNi_{1/3}Co_{1/3}Mn_{1/3}O_2$, $LiNi_{0.4}Co_{0.3}Mn_{0.3}O_2$, $LiNi_{0.5}Co_{0.2}Mn_{0.3}O_2$, $LiNi_{0.5}Co_{0.3}Mn_{0.2}O_2$, $LiNi_{0.8}Co_{0.1}Mn_{0.1}O_2$, $LiNi_{0.8}Co_{0.15}Al_{0.05}O_2$, $Li_{1.2}Mn_{0.4}Ni_{0.4}O_2$, $Li_{1.2}Mn_{0.6}Ni_{0.2}O_2$, $Li_{1.2}Mn_{0.56}Ni_{0.17}Co_{0.07}O_2$, $Li_{1.2}Mn_{0.54}Ni_{0.13}Co_{0.13}O_2$, $Li_{1.2}Mn_{0.56}Ni_{0.17}Co_{0.07}O_2$, $Li_{1.2}Mn_{0.54}Ni_{0.13}Co_{0.13}O_2$, $LiNi_{0.8}Co_{0.15}Al_{0.05}O_2$, $LiNi_{0.5}Mn_{1.48}Al_{0.02}O_4$, $LiNi_{0.4}Co_{0.2}Mn_{1.25}Ti_{0.15}O_4$ and $Li_{1.2}Ni_{0.18}Mn_{0.54}Co_{0.08}O_2$.

With respect to the average particle size of the positive electrode active material, in view of reactivity with an electrolyte solution, a rate characteristic and the like, a positive electrode active material having an average particle size within the range of, for example, 0.1 to 50 μm, preferably the range of 1 to 30 μm, and more preferably the range of 5 to 25 μm, can be used. The average particle size herein refers to a particle size (median diameter: $D_{50}$) at an integrated value of 50% in the particle size distribution (on the basis of volume) obtained by a laser diffraction scattering method.

The binder for a positive electrode is not particularly limited, and the same binder as that used for a negative electrode can be used. Of them, in view of versatility and low cost, polyvinylidene fluoride is preferable. The content of the binder for a positive electrode, in view of binding strength and energy density having a tradeoff relationship, preferably falls within the range of 1 to 25 parts by mass, more preferably the range of 2 to 20 parts by mass and further preferably, the range of 2 to 10 parts by mass, relative to 100 parts by mass of the positive electrode active material. Examples of the binder except for polyvinylidene fluoride (PVdF) include a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide and polyamide imide. As a slurry solvent, N-methyl-2-pyrrolidone (NMP) can be used.

The positive electrode current collector is not particularly limited, and, for example, aluminum, titanium, tantalum, stainless steel (SUS), other valve metals or alloys of these can be used in view of electrochemical stability. Examples of the form thereof include foil, flat plate and mesh. Particularly aluminum foil is suitably used.

In producing the positive electrode, a conductive aid can be added in order to decrease impedance. Examples of the conductive aid include carbonaceous fine particles such as graphite, carbon black and acetylene black.

(Electrolyte Solution)

As the electrolyte solution, a non-aqueous electrolyte solution can be used, which is prepared by dissolving a lithium salt in one or two or more non-aqueous solvents. The non-aqueous solvent is not particularly limited, and examples thereof include cyclic carbonates such as ethylene carbonate (EC), propylene carbonate (PC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); aliphatic carboxylic esters such as methyl formate, methyl acetate and ethyl propionate; γ-lactones such as γ-butyrolactone; linear ethers such as 1,2-ethoxyethane (DEE) and ethoxymethoxyethane (EME); and cyclic ethers such as tetrahydrofuran and 2-methyl tetrahydrofuran. As other non-aqueous solvents, aprotic organic solvents such as dimethylsulfoxide, 1,3-dioxolane, dioxolane derivatives, formamide, acetamide, dimethylformamide, acetonitrile, propionitrile, nitromethane, ethyl monoglyme, phosphoric acid triester, trimethoxymethane, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, and N-methyl pyrrolidone can be used.

In the present invention, a solvent mixture of a cyclic carbonate and a linear carbonate is preferable. In particular, a ternary-system solvent containing ethylene carbonate, dimethyl carbonate and ethyl methyl carbonate is preferable.

When the ternary-system solvent is used and a volume ratio of EC/DMC/EMC is represented by x:y:z, it is preferable that x is 5 to 50 vol %; y is 5 to 90 vol %; and z is 5 to 90 vol % (under the condition that x+y+z=100 vol %).

Examples of the lithium salt include LiFSI and $LiPF_6$. Also, other lithium salt may be further mixed and used. As the lithium salt other than LiFSI and $LiPF_6$, electrolyte materials usually used, such as $LiClO_4$, $LiBF_4$, $LiCF_3SO_3$, $LiN(CF_3SO_2)_2$ (hereinafter "LiTFSI"), $LiN(C_2F_5SO_2)_2$ (hereinafter "LiBETI"), $Li(CF_3SO_2)_3C$ and $Li(C_2F_5SO_2)_3C$, can be used.

The concentration of a lithium salt in the electrolyte solution is as follows. The concentrations of LiFSI and $LiPF_6$ are both 0.5 mol/L or more. If the concentration of one of LiFSI and $LiPF_6$ is less than 0.5 mol/L, even if amorphous carbon coated graphite having a specific surface area of 4 $m^2/g$ or less is used and further $LiPO_2F_2$ is added to the electrolyte solution, an excellent charging-rate characteristic cannot be attained. The concentrations of LiFSI and $LiPF_6$ are both preferably 0.55 mol/L or more and more preferably 0.65 mol/L or more. The total concentration of lithium salts is preferably 1 mol/L to 3 mol/L and more preferably 1.1 mol/L to 1.5 mol/L, in view of solubility and ion conductivity.

Further, according to the present invention, the electrolyte solution contains $LiPO_2F_2$ as an additive. The amount of $LiPO_2F_2$ added in the electrolyte solution is preferably 0.005 to 7 mass % and more preferably 0.5 to 5 mass %.

(Separator)

The separator can be provided between the positive electrode and the negative electrode. As the separator, a porous film and woven fabric and non-woven fabric made of a polyolefin such as polypropylene and polyethylene; a fluoro resin such as polyvinylidene fluoride; or polyimide or the like can be used.

(Battery)

Examples of the form of the battery include cylindrical, square, coin, button and laminate forms. In the case of laminate form, a laminate film is preferably used as an exterior package accommodating a positive electrode, a separator, a negative electrode and an electrolyte solution. The laminate film includes a resin substrate, a metal foil layer and a heat sealing layer (sealant). As the resin substrate, polyester and nylon are mentioned. As the metal foil layer, aluminum, an aluminum alloy and titanium foil are mentioned. As the material for the heat sealing layer, thermoplastic polymer materials such as polyethylene, polypropylene and polyethylene terephthalate are mentioned. The resin substrate layer and metal foil layer each are not limited to a single layer and may be constituted of two or more layers. In view of versatility and cost, an aluminum laminate film is preferable.

The positive electrode, negative electrode and separator arranged between them are accommodated in an outer container formed of a laminate film or the like, and the electrolyte solution is charged and the container is sealed. Alternatively, a structure where electrode groups having multiple pairs of electrodes stacked are housed can be used.

EXAMPLES

Now, the present invention will be specifically described by way of Examples; however, the present invention is not limited only to these Examples and can be appropriately modified within the scope of the present invention.

Production Example 1 (Production Example of Amorphous Carbon Coated Graphite)

Graphite was soaked in a 1 M aqueous sucrose solution and mixed by a mixer for 10 minutes. Thereafter, solid contents were separated by vacuum filtration, heated at 1000° C. for 3 hours under a nitrogen atmosphere and as a result, graphite was coated with amorphous carbon. The obtained aggregates were ground to obtain a carbon material having a predetermined average particle size. The thickness of the coating amorphous carbon determined by observation by a transmission electron microscope was about 30 nm.

Examples 1 to 5, Comparative Examples 1 to 5

A cell was prepared by using graphite coated with amorphous carbon in a negative electrode; $LiNi_{1/3}Co_{1/3}Mn_{1/3}O_2$ (abbreviation: NCM111) in a positive electrode; and an electrolyte solution obtained by dissolving a LiFSI salt, a $LiPF_6$ salt and $LiPO_2F_2$ in a solvent consisting of EC/DMC/EMC=2/4/4 (volume ratio). The particle size and specific surface area of graphite, the LiFSI and $LiPF_6$ salt concentrations, and the concentration of $LiPO_2F_2$ are shown in Table 1 below. Note that, the positive electrode and negative electrode were produced in accordance with the following method, layered with a porous polypropylene separator interposed between them such that the active material surfaces thereof face each other to form an electrode element, which was enclosed together with an electrolyte solution in an outer container formed of an aluminum laminate film, to prepare a test cell.

Negative Electrode:

Amorphous carbon coated graphite, carboxymethyl cellulose (CMC), a styrene-butadiene copolymer (SBR) and carbon black were mixed in a mass ratio of 92:2:2:4 and dispersed in a solvent mixture of water and NMP to prepare a negative electrode slurry. The negative electrode slurry was applied to a Cu foil having a thickness of 20 μm, which serves as a negative electrode current collector, dried and compressed to obtain a negative electrode.

Positive Electrode:

NMC111 having an average particle size of 10 μm, PVdF and carbon black were mixed in a mass ratio of 89:4:7 and dispersed in NMP to prepare a positive electrode slurry. The positive electrode slurry was applied to an Al foil having a thickness of 15 μm, dried and compressed to obtain a positive electrode.

At 20° C., the above cell was charged at a constant current of 0.1 C up to 4.2 V and discharged at a constant current of 0.1 C up to 2.5 V. Note that, at this time, the amounts of coating on the positive electrode and negative electrode were controlled such that the energy density became 160 Wh/kg. Subsequently, the cell was charged at a constant current of 6 C up to 4.2 V and discharged at a constant current of 0.1 C up to 2.5 V. The ratio of the 6 C charging capacity and the 0.1 C charging capacity thus obtained, (6 C/0.1 C charging capacity: (%)) was obtained as a charging-rate characteristic.

TABLE 1

|  | Average particle size (μm) | Specific surface area ($m^2/g$) | LiFSI (mol/l) | $LiPF_6$ (mol/l) | $LiPO_2F_2$ (mass %) | Charging-rate characteristic 6 C/0.1 C (%) |
|---|---|---|---|---|---|---|
| Example 1 | 21 | 1 | 0.65 | 0.65 | 1 | 65 |
| Example 2 | 20 | 4 | 0.65 | 0.65 | 1 | 70 |
| Example 3 | 16 | 3 | 0.65 | 0.65 | 1 | 78 |
| Example 4 | 10 | 4 | 0.65 | 0.65 | 1 | 80 |
| Comparative Example 1 | 10 | 6 | 0.65 | 0.65 | 1 | 58 |
| Comparative Example 2 | 10 | 10 | 0.65 | 0.65 | 1 | 34 |
| Example 5 | 10 | 4 | 0.55 | 0.55 | 1 | 77 |
| Example 6 | 10 | 4 | 0.50 | 0.50 | 1 | 66 |
| Comparative Example 3 | 10 | 4 | 0.45 | 0.45 | 1 | 43 |
| Comparative Example 4 | 10 | 4 | 0.45 | 0.55 | 1 | 46 |
| Comparative Example 5 | 10 | 4 | 0.65 | 0.65 | 0 | 59 |

When Examples 1 to 4 are compared to Comparative Examples 1 to 2, it is found that a charging-rate characteristic of 60% or more is obtained in the electrolyte solution containing LiFSI, $LiPF_6$ and $LiPO_2F_2$ at a specific surface area of graphite being 4 $m^2/g$ or less.

When Examples 1 to 3 are compared to Example 4, it is found that an excellent charging-rate characteristic is obtained at a graphite particle size of 20 μm or less and a more excellent charging-rate characteristic is obtained at a graphite particle size of 16 μm or less.

When Examples 4 to 6 are compared to Comparative Examples 3 to 4, it is found that a charging-rate characteristic of 60% or more is obtained at the concentrations of both LiFSI and $LiPF_6$ of 0.5 mol/l or more and the charging-rate characteristics of them are more excellent at a concentration of 0.55 mol/l or more.

When Example 4 is compared to Comparative Example 5, it is found that if $LiPO_2F_2$ is contained in an electrolyte solution, a charging-rate characteristic of 60% or more is obtained.

As described above, it was confirmed that high energy density of 160 Wh/kg and the charging-rate characteristic could be both obtained.

While the invention has been particularly shown and described with reference to example embodiments thereof, the invention is not limited to these embodiments and Examples. It will be understood by those of ordinary skill in the art that various changes in form and details may be made therein without departing from the spirit and scope of the present invention as defined by the claims.

The application is based upon and claims the benefit of priority from Japanese Patent Application No. 2016-117204 filed on Jun. 13, 2016, the disclosure of which is incorporated herein in its entirety by reference.

The invention claimed is:

1. A lithium ion secondary battery comprising a positive electrode, a negative electrode and an electrolyte solution, wherein
   the electrolyte solution comprises 0.5 mol/l or more of Li[$(FSO_2)_2N$], 0.5 mol/l or more of $LiPF_6$, and $LiPO_2F_2$; and
   the negative electrode comprises graphite deposited with amorphous carbon or graphite coated with amorphous carbon and having a specific surface area of 4 $m^2/g$ or less, as a negative electrode active material.

2. The lithium ion secondary battery according to claim 1, wherein an average particle size of the negative electrode active material is 1 to 30 μm.

3. The lithium ion secondary battery according to claim 2, wherein the average particle size of the negative electrode active material is 1 to 20 μm.

4. The lithium ion secondary battery according to claim 1, wherein a content of $LiPO_2F_2$ in the electrolyte solution is 0.005 to 7 mass %.

5. The lithium ion secondary battery according to claim 1, wherein the electrolyte solution comprises a cyclic carbonate and a linear carbonate as a solvent.

6. The lithium ion secondary battery according to claim 5, wherein the electrolyte solution comprises a ternary-system solvent of ethylene carbonate (EC), dimethyl carbonate (DMC) and ethyl methyl carbonate (EMC).

7. The lithium ion secondary battery according to claim 6, wherein, when a volume ratio of EC/DMC/EMC of the ternary-system solvent is represented by x:y:z, x is 5 to 50 vol %; y is 5 to 90 vol %; and z is 5 to 90 vol % (provided that x+y+z=100 vol %).

8. The lithium ion secondary battery according to claim 1, wherein the positive electrode comprises a lithium composite oxide as a positive electrode active material.

9. The lithium ion secondary battery according to claim 8, wherein the lithium composite oxide is a composite oxide having a layered structure.

10. The lithium ion secondary battery according to claim 9, wherein the composite oxide having the layered structure is a lithium-cobalt-nickel-manganese composite oxide.

11. The lithium ion secondary battery according to claim 1, wherein the electrolyte solution comprises 0.55 mol/l or more of Li[$(FSO_2)_2N$], 0.55 mol/l or more of $LiPF_6$.

12. The lithium ion secondary battery according to claim 1, wherein the specific surface area of the graphite as the negative electrode active material is 2 to 4 m²/g.

13. The lithium ion secondary battery according to claim 12, wherein the specific surface area of the graphite as the negative electrode active material is 3 to 4 m²/g.

* * * * *